United States Patent [19]

Walker et al.

[11] 4,313,400

[45] * Feb. 2, 1982

[54] LINED METAL TANK WITH HEAT SHIELD, INDIRECT FIRED WATER HEATER AND METHOD OF MAKING SAME

[75] Inventors: Robert Walker, Pawtucket, R.I.; Joseph A. Lane, Tauton, Mass.

[73] Assignee: Amtrol Inc., West Warwick, R.I.

[ * ] Notice: The portion of the term of this patent subsequent to Dec. 30, 1997, has been disclaimed.

[21] Appl. No.: 142,722

[22] Filed: Apr. 22, 1980

Related U.S. Application Data

[63] Continuation-in-part of Ser. No. 46,763, Jun. 8, 1979, Pat. No. 4,241,843.

[51] Int. Cl.³ .............................................. F22B 1/02
[52] U.S. Cl. ................................. 122/31 R; 122/13 R
[58] Field of Search ............................ 122/31 R, 13 R

[56] References Cited

U.S. PATENT DOCUMENTS

| | | | |
|---|---|---|---|
| 817,589 | 4/1906 | Roberts . | |
| 845,760 | 3/1907 | Coffin . | |
| 970,095 | 9/1910 | McPheeters . | |
| 999,672 | 8/1911 | Puffer . | |
| 1,327,693 | 1/1920 | Bewan . | |
| 1,511,852 | 10/1924 | Wagner . | |
| 1,549,721 | 8/1925 | Kraft . | |
| 1,673,653 | 6/1928 | Wagner . | |
| 1,691,912 | 11/1928 | Badger . | |
| 1,987,182 | 5/1932 | Dalen et al. | 122/33 |
| 2,113,060 | 4/1938 | Sandberg | 113/120 |
| 2,146,381 | 2/1939 | Rheem | 220/10 |
| 2,187,917 | 1/1940 | Skinner et al. | 122/14 |
| 2,263,021 | 11/1941 | Uecker | 220/64 |
| 2,302,835 | 11/1942 | Brasington | 215/40 |
| 2,303,126 | 11/1942 | Koppel | 220/70 |
| 2,317,734 | 4/1943 | Cook | 29/148 |
| 2,412,271 | 12/1946 | Kercher | 29/143.2 |
| 2,503,339 | 4/1950 | Jandus | 220/10 |
| 2,542,543 | 2/1951 | Losee | 219/39 |
| 2,551,484 | 5/1951 | Branning | 220/75 |
| 2,587,840 | 3/1952 | Gruetjen | 220/67 |
| 2,620,963 | 12/1952 | Hagopian | 229/67 |
| 2,666,979 | 1/1954 | Van Dusen | 29/148.2 |
| 2,721,580 | 10/1955 | Greer | 138/30 |
| 2,726,643 | 12/1955 | Edwards | 122/33 |
| 2,729,313 | 1/1956 | Ernestus | 189/3 |
| 2,758,367 | 8/1956 | Dougherty . | |
| 2,794,570 | 6/1957 | Downs | 220/63 |
| 2,809,267 | 10/1957 | Schauer | 219/38 |
| 2,809,762 | 10/1957 | Cardona | 220/3 |
| 2,820,427 | 1/1958 | Chyle et al. | 113/111 |
| 2,866,742 | 12/1958 | Sutton | 204/197 |
| 2,970,719 | 2/1961 | Brady | 220/75 |
| 2,987,216 | 6/1961 | Fletcher | 220/39 |
| 3,057,509 | 10/1962 | Bernd | 220/63 |
| 3,064,344 | 11/1962 | Arne | 29/421 |
| 3,123,054 | 3/1964 | Smith | 122/135 |
| 3,132,761 | 5/1964 | Sylvester | 220/3 |
| 3,247,999 | 4/1966 | Stilwell | 220/63 |
| 3,253,731 | 5/1967 | Fink et al. | 220/9 |
| 3,313,020 | 4/1967 | Krauskopf | 29/445 |
| 3,326,141 | 6/1967 | Graves | 105/358 |
| 3,328,496 | 6/1967 | Graves | 264/45 |
| 3,358,118 | 12/1967 | Mather et al. | 219/311 |
| 3,614,967 | 10/1971 | Royston | 138/141 |
| 3,854,454 | 12/1974 | Lazaridis | 122/33 |
| 3,901,278 | 8/1975 | Feistel | 138/30 |
| 4,099,641 | 7/1978 | Schiedat | 220/444 |
| 4,241,843 | 12/1980 | Walker et al. | 220/5 A |

FOREIGN PATENT DOCUMENTS 259181 6/1926 Fed. Rep. of Germany .
1160998 1/1964 Fed. Rep. of Germany .

*Primary Examiner*—Henry C. Yuen
*Attorney, Agent, or Firm*—Fisher, Christen & Sabol

[57] ABSTRACT

A metallic tank having an insulated interior is disclosed which exhibits unique features to enable the welding of the tank sections together without damage to the insulation. The insulating lining is installed in the multi-piece metallic tank prior to the welding of the tank sections together. A heat shield is provided between the weld area and the insulating liner to prevent damage to the nonmetallic liner during the welding process. The method of assembly allows the economical and rapid fabrication of lined metallic tanks without fear of damaging the lining material. Also, an indirect fired water heater which has a tube heat exchanger in the lined metal tank with the heat shield. The inlet and exit lines of the heat exchanger pass through a bottom plate of the tank. The tank, in such case, contains potable water which is heated by contact with the heat exchanger located within the vessel. Hot boiler water passes through the heat exchanger to heat the water in the vessel. Fittings installed through the top and/or bottom portion of the vessel wall facilitate the drawing off of the heated water and the filling of the vessel with cold water.

11 Claims, 3 Drawing Figures

LINED METAL TANK WITH HEAT SHIELD, INDIRECT FIRED WATER HEATER AND METHOD OF MAKING SAME

This is a continuation-in-part of U.S. application Ser. No. 46,763, filed June 8, 1979, now U.S. Pat. No. 4,241,843.

BACKGROUND OF THIS INVENTION

1. Field of this Invention

This invention relates to lined metallic tanks and methods of making same, more particularly those methods involving welding a multi-piece metallic tank without damaging the nonmetallic lining material, and to indirect fired water heaters, more particularly to such heaters having a lined metallic vessel.

2. Prior Art

The tank manufacturing industry has long been plagued with the problems associated with forming a multi-piece metallic tank structure having a nonmetallic lining on its interior. Since such tanks have achieved widespread usage in virtually every field, including hot water storage tanks, hot water heating tanks, accumulators for hot water heating systems, liquid transportation systems, etc., the problem of economically fabricating such tanks is one of substantial magnitude. Due to the enclosed nature of such vessels, they are more easily fabricated in serveral sections which are subsequently welded together. However, when a nonmetallic lining is associated with the tank, the problem of welding the tank sections together is magnified, since it must be done without destroying the continuity of the interior lining. Any break or discontinuity in the lining will result in the eventual contamination of the tank's contents and corrosion of the metal tank.

Several attempts have been made to overcome this problem. One solution has been to apply the coating to the metal tank after it has been welded together, as exemplified in U.S. Pat. No. 2,758,367. However, this drastically limits the types of coating that may be applied to the interior of a closed vessel. Such a process is also time consuming and expensive, and there is no assurance that the lining completely covers the interior of the vessel as intended.

Where a foamed material is utilized as the insulating lining, it may be foamed in situ. This involves the use of an interior and exterior vessel wherein the foam is placed in the space between the two vessels. The plastic bottle may be considered as an interior vessel but not capable of withstanding any appreciable pressure on its own. (The insulation obtained by foaming in place is different from the design of this invention where the foam is formed into the desired shape from a separate mold.) Processes utilizing these concepts are shown in U.S. Pat. Nos. 3,313,020 and 3,328,496. This process is more expensive since it requires the use of two vessels. The foam must also be foamed in small sections to allow for the complete escape of the gases generated by the foaming process and, therefore, such method is unduly time consuming when fabricating large vessels or tanks.

Another method of fabricating lined, multi-piece metallic vessels involves the use of a chill ring placed in the interior of the metallic vessel adjacent the weld area. The chill ring is usually an annular metal structure, which may or may not have a coating thereon, and serves to absorb the heat generated by the welding process such that it does not destroy the tank lining. But chill rings do not protect the material inside of the tank directly underneath the chill rings. The use of chill rings are well-known and are shown in U.S. Pat. Nos 2,412,271 and 2,970,719. The drawbacks to such system are obvious, insofar as the use of a separate structure increases the cost and weight of the tank while serving effectively no useful purpose once the tank is welded together.

It is also known to utilize a rubber material as an insulating band installed adjacent to a welding area, as set forth in U.S. Pat. No. 2,587,840. However, the purpose of this insulating band is not to protect the lining of the tank since there is no lining in the area which the band is used, but to prevent the current generated by the electric welding process form jumping to an adjacent metallic wall. Other methods of fabricating welded vessels are set forth in U.S. Pat. Nos. 845,760, 2,113,060, 2,820,427 and 3,253,731. See also U.S. Pat. Nos. 2,542,543, 2,317,734, 1,549,721, 4,099,641, 2,729,313, 2,263,021, 2,146,381, 2,551,484, 3,358,118, 3,614,967 and 3,326,141.

Typical prior art hot water heaters comprise a generally cylindrical storage tank, and heating means to heat the water stored in the tank. In direct fired water heaters the heating means may take the form of a gas burner located at the base of the cylindrical tank (as shown in U.S. Pat. Nos. 817,589 and 2,187,917) or electrical heating elements extending into the tank (shown in U.S. Pat. No. 2,303,126). The cold water usually enters through the top of the tank passing downwardly in a tube and exiting near the bottom of the tank. When heated, the water rises and is drawn off by a hot water exit tube.

Indirect fired water heaters are also known. They differ from the aforementioned directed fired type insofar as the heater water within the storage tank is not withdrawn and used, but acts as a heat exchange medium. Cold water in the storage tank is warmed by a heat exchanger with the heated water. No direct contact is made with the heating means or the heated stored water.

Most of the prior art water heaters, whether the direct or the indirect type, use some form of insulation around the exterior of the tank to prevent undue loss of heat by radiation. Solid flexible insulation is placed around the tank and retained in position by an outer wall, as shown in U.S. Pat. Nos. 2,303,126 and 2,187,917.

It is also known to make a water storage tank having concentrically arranged inner and outer tanks with a vacuum insulating space therebetween (U.S. Pat. No. 1,327,693). However, such tanks are normally used only for the storage and not the heating of water, since the insulating space on the bottom would prevent heat transfer between a burner and the inner tank.

Containers having inner and outer spaced apart walls with an insulating vacuum therebetween are shown in U.S. Pat. Nos. 1,511,852 and 1,673,653. These containers are used to store a liquid and to prevent transfer of heat to or from the liquid. See also U.S. Pat. Nos. 999,672, 1,691,912, 2,666,979 and 3,123,054.

See further U.S. Pat. Nos. 2,794,570, 3,064,344, 2,787,216, 3,247,999, 2,721,580, 2,302,835, 3,132,761, 3,057,509, 2,620,963 and 2,809,762.

BROAD DESCRIPTION OF THIS INVENTION

An object of this invention is to provide a tank and process which obviates the abovementioned prior art problems. Other objects and advantages of this invention are set out herein or are obvious herefrom to one ordinarily skilled in the art.

The objects and advantages of this invention are set out herein or are obvious therefrom to one ordinarily skilled in the art.

The objects and advantages of this invention are achieved by the tank, heater and processes of this invention.

This invention obviates the problems associated with the aforementioned prior art teachings and provides a method of making a nonmetallic lined metallic tank that is rapid, economical, and involves no extraneous elements which take up usable space in the tank's interior. The tank according to this invention comprises a multi-piece metallic outer tank, an insulating liner of foam material (such as urethane foam), and a rigid plastic inner tank. The inner nonmetallic liner makes the tank corrosion resistant. The inner nonmetallic liner can be made of, for example, plastic (preferred) or rubber. A heatshield of high temperature silicone rubber (preferred) or equally resistant material is placed around the exterior of the insulating liner so as to be located between it and the metallic tank, at the location where the metallic outer tank sections are welded together. The urethane foam liner may have indentations therein to accommodate the heat shield such that the heat shield does not in any way enlarge the requisite dimensions of the tank. It has been found that the high temperature silicone rubber effectively insulated the urethane from the heat generated during the welding process such that the foam is in no way damaged thereby. The high temperature silicone rubber can be replaced with any equivalent high temperature resistant material having a low coefficient of heat conductivity or transfer.

To assemble the tank, the two vertically divided halves of the urethane foam insulation are placed around the one piece inner plastic tank and this assembly is placed in a first portion of the metallic tank, preferably a lower half. A heat shield, preferably of high temperature silicone rubber, is placed around the exterior of the insulating liner in an indentation provided adjacent the welding area. A second metallic portion is then placed over this structure and the metal tank portions are welded together.

Another embodiment of this invention is directed toward a novel construction of an indirect fired water heater. The water heater comprises the lined metallic vessel of this invention having a heat exchanger (e.g., a finned tube heat exchanger or a smooth-type heat exchanger) disposed therein. Assembly is done in much the same manner as the heat exchanger fits through the bottom port and is affixed into place via attachment of its inlet and outlet tubes (pipes) to (and through) the bottom cover plate of the tank. Cold water contained within the vessel is heated by hot water circulating through the heat exchanger. The vessel is of multi-piece constructions having upper and lower sections welded together about their circumferences.

The cold water to be heated enters the interior of the vessel via through a fitting entending through the bottom wall of the lined vessel. Alternately, the fitting may extend through the bottom plate. After or during heating, the water can be withdrawn through one or more sililar through fittings. The water is heated via hot water passing through the heat exchanger located within the inner vessel. The inlet and outlet for the heat exchanger extend through the bottom plate covering an opening in the vessel and are connected to a heating device to heat the water circulating through the heat exchanger.

The lined vessel is provided with insulation means between the outer metallic tank and the inner plastic liner to prevent undue heat loss by radiation and to prevent injury caused by an individual coming into contact with the heated vessel.

An electrical imersion heater can be attached to the heat exchanger plate to provide for auxillary heating.

DETAILED DESCRIPTION OF THIS INVENTION

Detailed Description of the Preferred Embodiments

Figure 1:
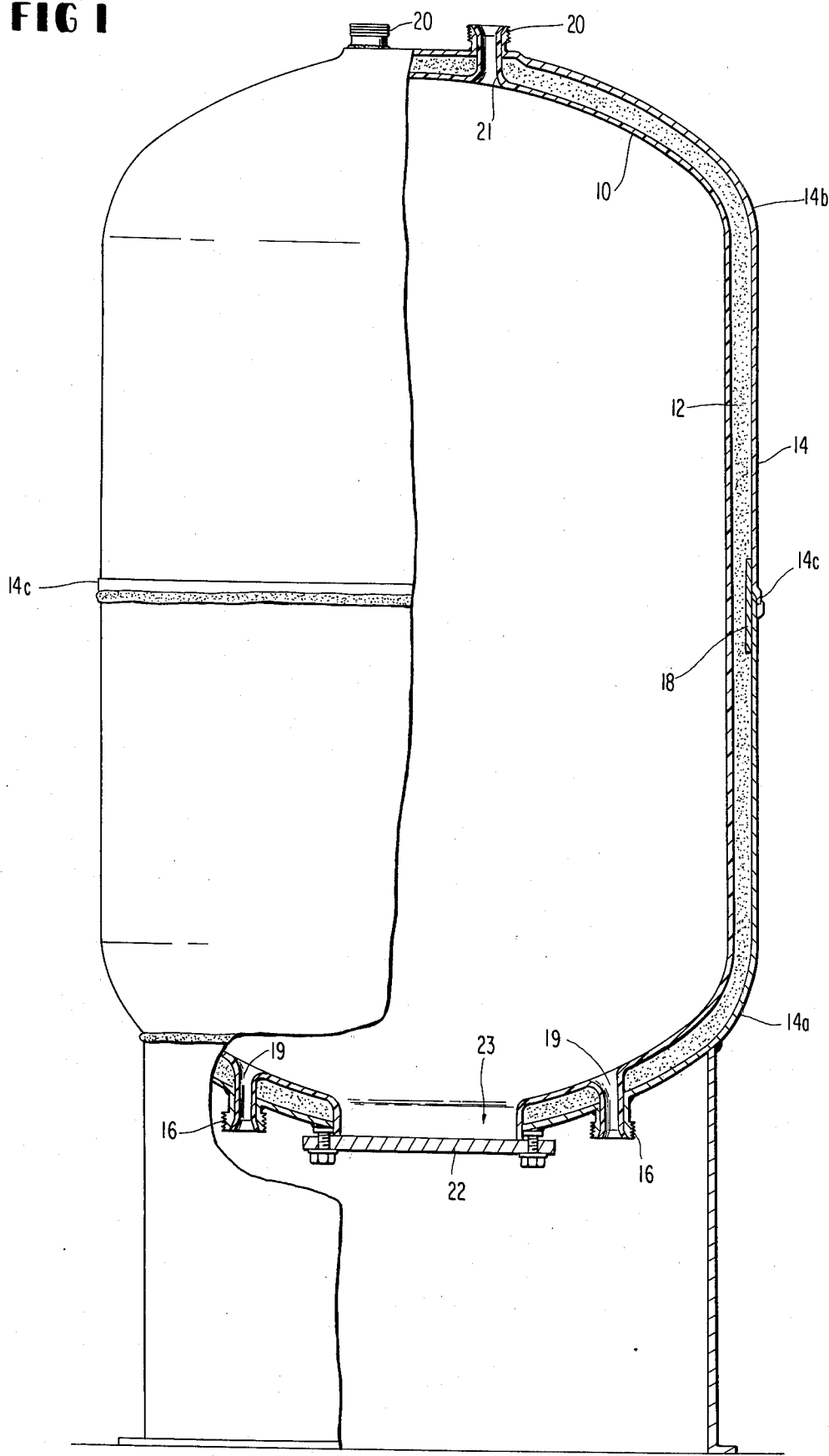
FIG. 1 is a side view, partially broken away, of a lined metallic tank according to this invention.
Figure 2:
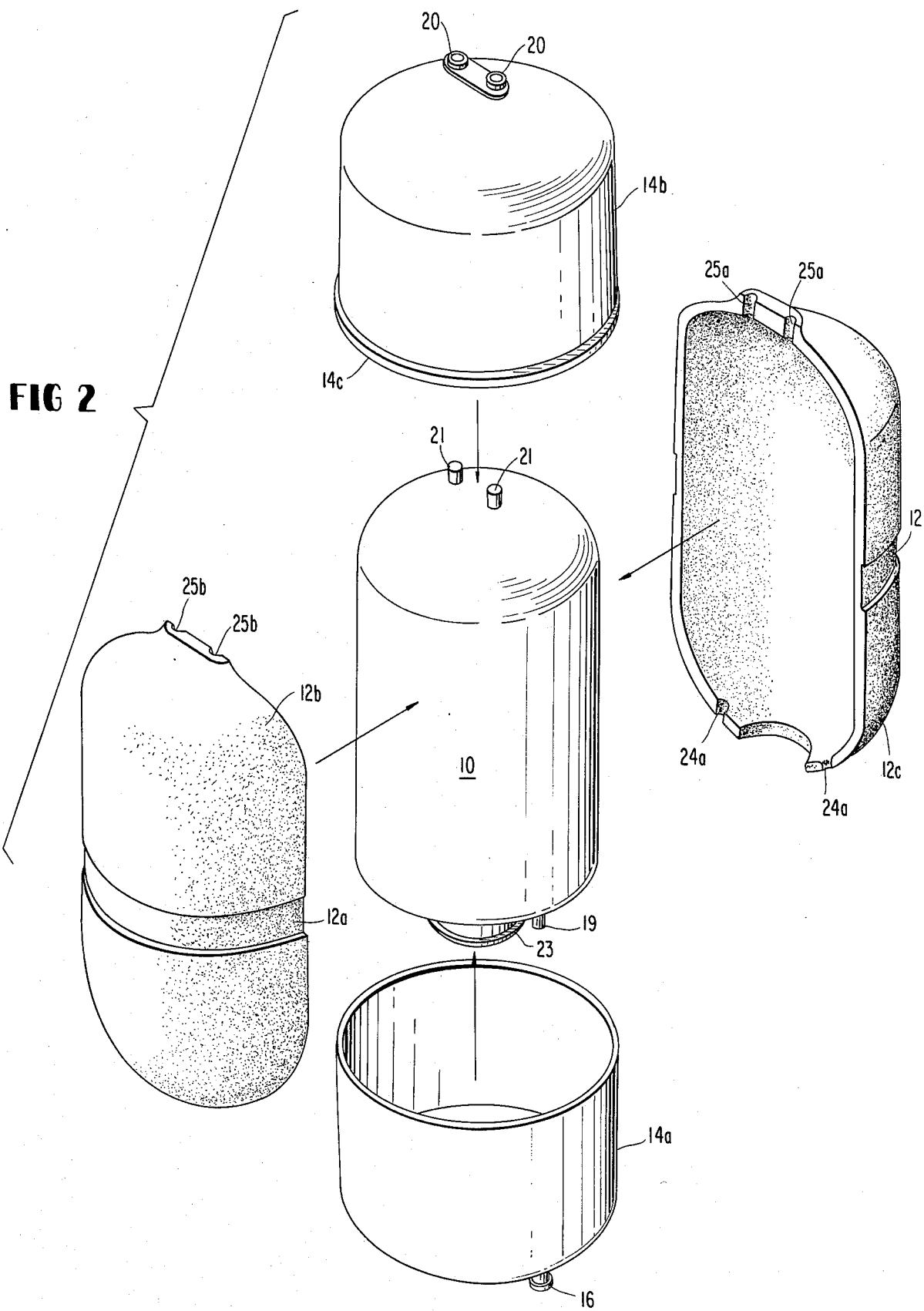
FIG. 2 is an exploded, perspective view of the tank of FIG. 1.

The tank according to this invention is shown in FIG. 1 and comprises one-piece inner plastic tank 10, foam liner 12 and metallic tank 14. Plastic tank 10 can be made of any rigid or semi-rigid plastic material depending, of course, on the type of liquid with which the tank is intended to be used. Metallic tank 14 is shown as being comprised of lower and upper portions 14a and 14b, respectively, divided in a horizontal plane at its approximate mid-point. This construction, however, is merely for the purposes of illustration and it is understood that the tank can be constructed of any number of portions divided either horizontally, vertically, or at any other orientation. The lower tank portion is shown as having two connecting means 16 which can be connected to the system utilized for filling or emptying the tank, or if the tank is utilized in a fluid system of any sort, connections 16 illustrates the means by which the tank is connected to such system. Metallic tank 14 can be constructed of metal such as steel (preferred), titanium, aluminum, etc. Connecting means 16 communicates with the interior of plastic tank 10. Nipples 19 of plastic tank 10 fit through the lower holes in the foam insulation halves 12c and 12b formed by lower slots 24a and 24b (not shown) therein, respectively, and snuggly fit into and all of the way through connecting means 16. Suffice to say that it is not critical to the instant invention that the connecting means be located in the lower portion of the tank, and it can be located in any desired position.

Inner plastic tank 10 most preferably is polyethylene, having a thickness of about 60 to 150 mils. Obviously, any other plastic material or rubber can be used as long as it does not contaminate the water (or other contents) in inner plastic tank 10 and prevents corrosion of metallic tank 14 itself. Polyethylene can be used at temperatures up to 180° F.

As is illustrated in the Figures, insulating liner 12, which can be urethane foam, or any other foam material depending upon the use of which the tank is subjected, has an indentation 12a about its exterior periphery at the location of the juncture of the upper and lower metal tank portions. This is to accommodate heat shield 18, which is in the form of an annular band and is preferably fabricated of high temperature silicone rubber. Insulating liner 12 helps to minimize heat loss by radiation.

Upper tank portion 14b is shown having two connection means 20, which communicate with the interior of plastic tank 10. Nipples 21 of plastic tank 10 fit through upper holes in foam insulation halves 12c and 12b formed by upper slots 25a and 25b therein, respectively, and snuggly fit into and all of the way through connecting means 20. Plate 22 is bolted onto the bottom port 23 of tank 10.

To assemble the tank the one-piece inner plastic tank 10 is placed inside of the vertically divided foam insulation halves 12b and 12c and this assembly is placed into lower tank portion 14a. Although two halves 12b and 12c are shown, it is understood that insulating liner 12 can be divided vertically into several sections to facilitate handling, depending upon the size of the tank to be fabricated. High temperature silicone rubber heat shield 18 is then placed in peripheral notch 12a on the foam liner and fastened in position by any known means. Upper tank portion 14b is then placed over this assembly such that peripheral flange 14c rests on the upper edge of lower tank portion 14a, as shown. The assembly is then welded at the juncture of tank portion 14a and 14b by any known welding means. Heat shield 18 insulates the urethane foam 12 and nonmetallic inner tank liner 10 from damage due to the heat generated during the welding process. The thusly assembled tank is then ready for use.

Although the assembly method has been described in terms of a vertically oriented tank, the method according to this invention is equally applicable to a horizontally oriented tank. Also, metallic tank 14 can be divided into more than two sections as described, depending of course on the dimensions of the finished product.

The nonmetallic lined tank of the invention can be used to store fluids (liquid or gas) and chemical reactions can be conducted therein. The fully lined (pressurizable) tank can be used as a hot water storage tank, a potable water storage tank, a chlorine holding tank, a solar heat storage tank, a storage tank for potable fluids such as carbonated beverages, alcoholic beverages, syrups, pharmaceuticals and the like which will not contaminate such fluids, or a tank for storing and transporting insecticides, fungicides, pesticides and other chemicals.

Figure 3:
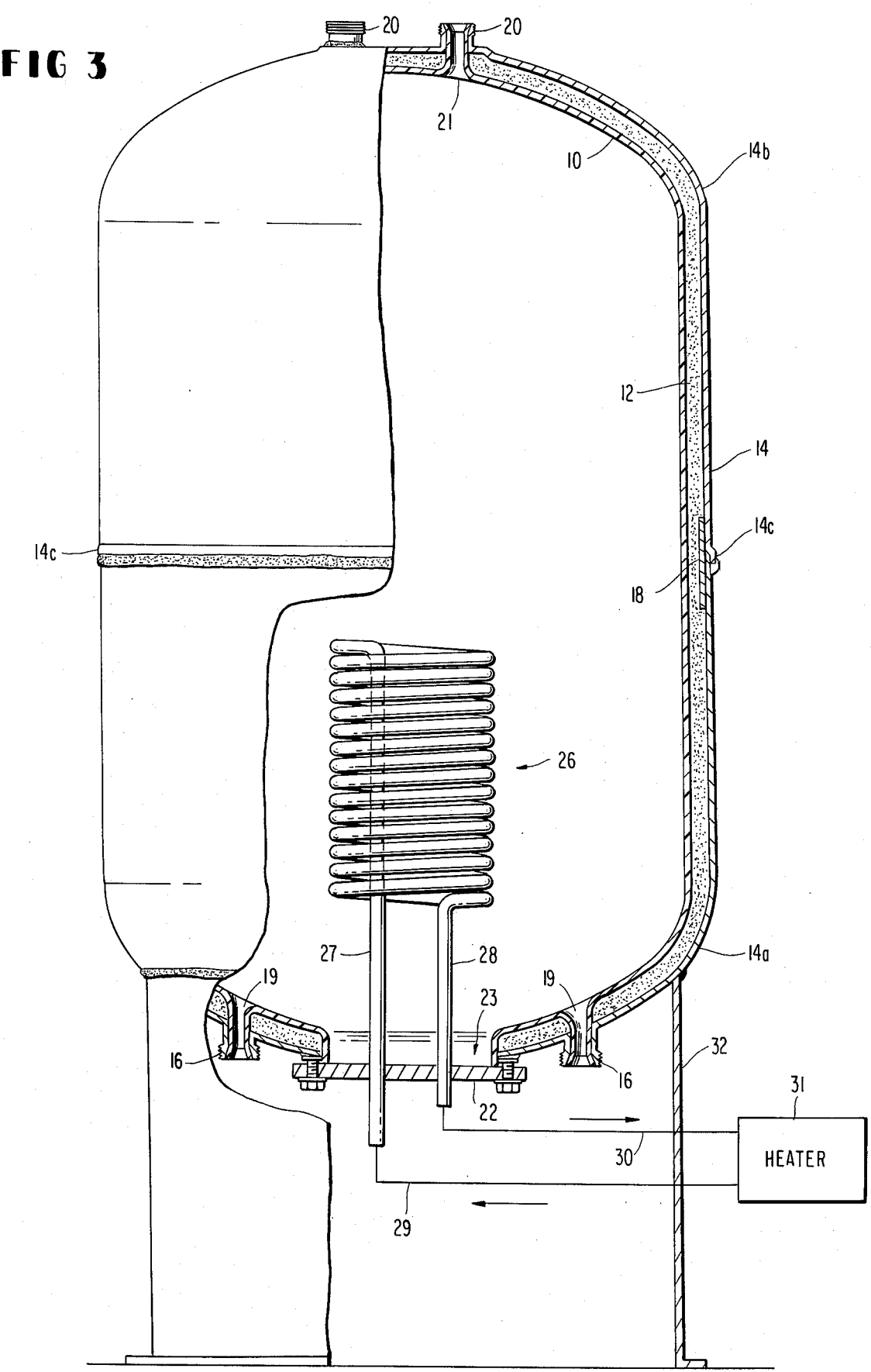
FIG. 3 is a side view, partially broken away, of an indirect fired water heater according to this invention.

The indirect fired hot water of this invention is shown in FIG. 3 and is the same as the tank shown in FIG. 1, except that it further includes smooth-type tube heat exchanger 26. Smooth-type tube heat exchanger 26 extends into the interior of nonmetallic tank 10, with inlet pipe 27 and outlet pipe extending through bottom plate 22 covering bottom opening 23. (Tube heat exchanger 24 can be a finned tube heat exchanger, etc.)

Smooth-type tube heat exchanger 26 has inlet tube 27 and outlet tube 28 extending externally of bottom plate 22. Inlet tube 27 and outlet tube 28 are connected to heater 31 via conduits 29 and 30, respectively, shown diagrammatically in FIG. 3, (extending through the wall of tank stand 32). Heater 31 can be any known apparatus for heating water, such as, an electric or gas burner. A pump (not shown) can also be used to transfer the hot water from heater 31 and cause it to circulate through heat exchanger 26 and back to heater 31. No detailed description of the pump or its connection to the circuit is believed to be necessary since such are well within the ordinary level of skill in the art.

Cold water is supplied to nonmetallic tank 10 through one of bottom fittings 16, which connect the interior of plastic tank 10 with external conduits (not shown) for supplying cold water. The water is drawn off after it has been heated through one of top fittings 20, which are connected to external conduits (not shown). Fittings 16 and 20 can have standard pipe connections on their external end to facilitate connection with the aforementioned conduits, etc. Although two top and two bottom fittings are shown, it is understood that any number (e.g., one, three) of such fittings can be used. Bottom fittings 16 can alternately be located in bottom plate 22.

In operation, the cold water to be heated is pumped into plastic tank 10 by standard known pumping means or by city water pressure. Hot water is caused to circulate through tube heat exchanger 26 thereby transferring its heat to the colder water within the vessel. The water within heat exchanger 26 then returns to heater 31 via conduit 28-30 to be reheated. The water within plastic tank 10, which is now heated, can be withdrawn through top fittings 20. Plastic tank 10 prevents contamination of the water so that it is not rendered unfit for human consumption.

It is understood that the foregoing description of the tank and method of making it are for illustrative purposes only and that various modifications can be made thereto without exceeding the scope of the appended claims.

What is claimed is:
1. An indirect fired water heater comprising:
 (a) a multi-section metallic outer tank wherein the sections are welded together;
 (b) a liner of foam insulating material disposed on the interior of said multi-section outer tank, said foam insulating liner having a smooth interior without any inwardly deformed regions;
 (c) heat shield means disposed between said outer tank and said foam insulating liner adjacent the welded junctions of said outer tank to prevent damage to or destruction of said foam insulating liner caused by heat generated during the welding operation;
 (d) said foam insulating liner having retaining means for securement of said heat shield means adjacent each welded junction, said retaining means not inwardly deforming said foam insulating liner in the region of each welded junction and securing said heat shield means in position even when said outer tank is not in place;
 (e) an inner tank of nonmetallic material disposed inside of said foam insulating liner;
 (f) means to place water to be heated within said inner tank and to withdraw same therefrom; and
 (g) heat exchange means located within said inner tank to transfer heat from a fluid passing therethrough to said water within said inner tank.
2. The indirect fired water heater as claimed in claim 1 wherein said heat shield means is a ring made of a high temperature silicone rubber or equivalent high temperature material which has a low coefficient of heat conductivity.
3. The indirect fired water heater as claimed in claim 2 wherein said foam insulating liner is made of a urethane foam.
4. The indirect fired water heater as claimed in claim 1 wherein said foam insulating liner is made of a urethane foam.
5. The indirect fired water heater of claim 1 wherein said heat exchange means is of the finned tubing-type or the smooth tubing-type.

6. The indirect fired water heater of claim 5 wherein there is also means to circulate a heated liquid through said tube heat exchanger.

7. The indirect fired water heater of claim 6 wherein said heated liquid is water.

8. The indirect fired water heater of claim 1 wherein said inner tank is made of a plastic or a rubber.

9. The indirect fired water heater of claim 8 wherein said inner tank is made of polyethylene.

10. The indirect fired water heater of claim 8 wherein said inner tank has a thickness of about 60 mils to about 150 mils.

11. The indirect fired water heater as claimed in claim 1 wherein said retaining means is comprised of an outer peripheral groove located in said foam insulating liner, said peripheral groove being located along said welded junction or junctions and in which said heat shield means is disposed.

* * * * *